PROCESS FOR PREPARING AN ELECTROCOATING BATH
Filed Jan. 11, 1965
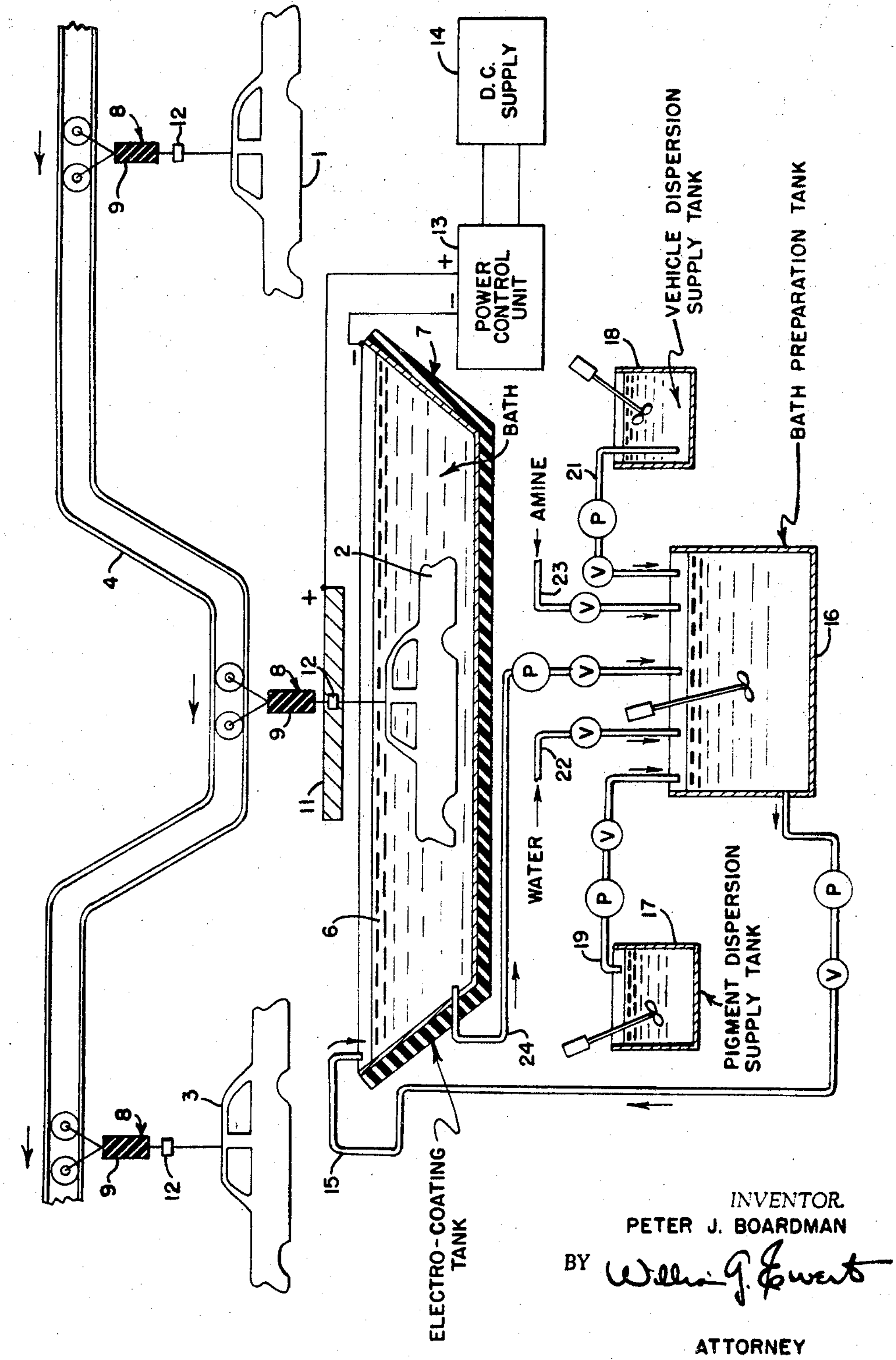
INVENTOR.
PETER J. BOARDMAN
BY William G. Ewert
ATTORNEY 3,404,079
Patented Oct. 1, 1968

3,404,079

PROCESS FOR PREPARING AN ELECTROCOATING BATH

Peter J. Boardman, St. Paul, Minn., assignor, by mesne assignments, to Ashland Oil and Refining Company, a corporation of Kentucky Filed Jan. 11, 1965, Ser. No. 424,550
8 Claims. (Cl. 204—181)

ABSTRACT OF THE DISCLOSURE

An electrocoating bath is prepared by bringing together and admixing a pigment component and polycarboxylic acid resin binder component in the presence of sufficient liquid diluent to provide an electrocoating bath with a total nonvolatile solids content suitable for electrocoating.

This invention relates to a process for the electrocoat painting of electrically conductive substrates such as metallic articles and the like. In another aspect, it relates to a process for preparing an electrocoat painting bath comprising pigment, vehicle and diluent. In a further aspect, it relates to an improved process for the electrocoat painting of metallic articles such as automobile bodies using a specially prepared stable, low solids electrocoating bath.

In the last several years, the electrocoat painting process (or electrophoretic deposition of paint) has made significant strides in a number of industries, particularly the automotive industry where primer coatings are electrophoretically applied to automobile bodies. Briefly, this new method of applying paint comprises diluting a high solids formulated paint (comprising a mixture of pigment and a vehicle) to a low solids level with a high dielectric liquid (usually water containing amine) to obtain an electrocoating bath, immersing the article to be coated in the bath and making the article the anode in a DC electric circuit. The tank containing the low solids bath is made the corresponding cathode or, alternatively, separate cathodes are placed in the bath. When DC current is applied, the resulting negatively-charged or anionic dispersed colloidal pigment and vehicle particles of the diluted paint migrate due to electrophoretic phenomenon toward the conducting surface of the article and are deposited thereon in the form of a film or coating. The coated article is then withdrawn from the tank and usually rinsed with water and stoved (baked).

This new technique of applying paint has a number of desirable features which distinguish it from paint spraying and dipping processes. Electrocoat painting produces a uniform, essentially solvent-free coating on electrically conductive articles notwithstanding the intricate, complex and often difficultly accessible surfaces of such articles, as in the case of rocker panels of automobile bodies. This technique results in smooth coatings without runs or sags, and good penetration of spot welded surfaces and good coverage of recessed areas and sharp corners are obtained with practically full utilization of the paint. However, there are a host of variables or factors, many of which are not fully understood, involved in this still relatively new coating technique which detract from its desirable features. The high solids paints which are formulated for electrocoat painting are often unstable and the pigment and resin solids tend to agglomerate, separate or stratify, sometimes even after the paint is diluted to bath concentration or during the electrocoating operation. The settled or agglomerated solids are often difficult to redisperse, and the desired bath pigment and resin concentrations, or ratio of these concentrations, are not achieved or are difficult to maintain. Of course, when these solids settle or agglomerate, problems in handling such systems arise. These unstable systems adversely affect the efficiency of the electrocoating operation and produce coatings or films which are unsatisfactory (e.g., poor surface integrity, too high or too low pigment solids, too high or too low film thickness, poor adherence to the metallic surface, etc.). These unstable coating systems are erratic in their response to such variables as pH, electrolyte concentration, etc. Unfortunately, the bath conditions are not static or constant. As a result, it is not uncommon to find it necessary to stop the electrocoating process and replace the entire bath; the undesirable economics of this remedial action are evident, especially when, as in the case of electrocoating automobile bodies, it may be necessary to dump 45,000 gallons of bath and hold up an assembly line while a new paint formulation is made and a new bath is prepared therefrom. Also, additional time is consumed waiting for equilibrium conditions to be obtained. Replenishing the bath with paint to compensate for the amount of paint deposited and removed on articles also presents difficulties under production conditions because the composition of the removed paint is not the same as that remaining in the tank.

Accordingly, an object of this invention is to provide an improved process for preparing an electrocoat painting bath. Another object is to provide an improved process for electrophoretically depositing paint on metallic articles and other electrically conductive substrates. Another object is to provide an electrocoat painting bath whose properties and composition can be readily controlled and maintained. Another object is to provide electrocoated articles having coatings with satisfactory surface integrity, thickness and composition. A further object is to provide an improved electrocoating bath and operation for applying a rush-inhibiting primer coating to automobile bodies. Various other objects and advantages of this invention will become apparent from the following description, accompanying drawing and appended claims.

Briefly, according to this invention, the pigment (and/or filler) and vehicle (or binder) paint components are separately prepared as dispersions of solids and admixed or brought together only in the presence of sufficient bath diluent to disperse these components to the low bath concentrations desired for electrocoating (generally, 5 to 35 weight percent total non-volatile solids). That is, the pigment and vehicle components are not brought together to form a paint, in the conventional sense, as a preliminary step to the preparation of the bath. Rather, the pigment and vehicle components are maintained as "separate entities" until they are added singly to the bath diluent, with agitation of the diluents during such addition. As such, there never is a high concentration of pigment and vehicle solids in the same formulation. This distinguishes such preparation or procedure from the conventional paint formulation technique, which entails premixing the pigment and vehicle components together at a high solids level, with consequent problems and expense in maintaining the stability of the paint formulation. The separate pigment and vehicle entities used in this invention can be prepared conventionally except that they must be stable by themselves (chemically and mechanically) and upon dilution and admixture in the bath and during the electrocoating process.

The separate entity concept of this invention enables one to exercise effective control over the many variables, which control cannot be achieved in the case with the conventional eletcrocoating system. This invention lends itself to a continuous bath formulation and electrocoating process with easy, accurate and continuous control and manipulation over such variables as the concentrations of pigment and vehicle solids, electrolyte, diluent and the usual additives. It further allows control over the pigment/vehicle volume ratio, pigment particle size, and many other variables, since the composition and flow rate of any of the bath feed streams (pigment, vehicle, diluent, electrolyte, etc.) can be changed or manipulated at will to compensate for disturbance in the system or to obtain different coating. No longer will it be necessary to operate under suboptimum conditions until equilibrium conditions are obtained. Rather, according to this invention, electrocoating at optimum conditions can begin practically immediately upon formulation of the bath and can be continued thereafter at the same optimum conditions. The build-up or depletion of any bath component, such as pigment solids, resin solids, electrolyte, diluent, etc., can be readily compensated for by manipulation of the flow rate and/or composition of that component to the system. As a consequence, operations are simplified and the texture, thickness, and other characteristics of the deposited film can be controlled and adjusted. In fact, the nature or properties of the coating on the finished article can be continuously monitored and feedback control exercised automatically or manually on the many variables affecting the coating without significant lags or time delay.

Reference will now be made to the accompanying drawing, the single figure of which illustrates a preferred embodiment of this invention, namely the electrocoating of steel automobile bodies with a rust-inhibiting primer. In this embodiment, a plurality of metal (i.e., steel) automobile bodies 1, 2 and 3 are transported in a conventional manner by a conveyor 4 to an electrocoating bath 6, prepared according to this invention, disposed in an electrically insulated electrocoating tank 7, which can be, for example, 90 feet long, 11 feet wide and 8 feet deep and can contain 45,000 gallons of bath. The automobile bodies which are to be coated with primer can be prepared by chemically cleaning and pre-coating the bodies with zinc phosphate, in a conventional manner, before they are immersed in bath 6. The bodies can be suspended from the conveyor 4 in any suitable fashion; for example, they can be hung by a hanger generally designated 8 which has an electrically insulated portion 9 to isolate the body from ground. Both the conveyor and the hangers (which suspend the bodies) do not contact the bath 6 and are electrically grounded. A positively-charged bus bar 11, or the like, is disposed parallel to a portion of the conveyor 4 above tank 7, and it comes into electrical contact in turn with each contact plate 12, or other suitable brush arrangement, of each hanger 8, thus charging in turn each body suspended from the conveyor just before it is completely immersed in bath 6, while it is moved therethrough, and just after it is withdrawn from the bath. Supplemental or auxiliary electrodes can be disposed in the bath as desired. (Alternatively, the electrocating tank can be made of non-conductive material, e.g., glass or ceramic, and separate cathodes, e.g., iron panels, can be disposed in the bath.) During the electrocoating operation, the well-known electrophoresis, electrolysis and electro-osmosis phenomena occur, and the electrogenic colloidal particles (pigment and resin) move toward the article and are co-deposited thereon. Following the electrocoating operation, which, for example, can be one to two minutes, the coated body is withdrawn from the bath 6 and can be passed, as in the case of coated body 3, to a rinse area where the coated body can be sprayed with high-pressured water (e.g., 40 p.s.i.), which can contain detergent, to wash away all unconverted or uncoagulated paint, and thence passed to a stoving area where the coating is cured, for example, twenty minutes at a metal temperature of 350° F. The coated body can then be sprayed with a guide-coat, rebaked and wet-sanded before it is ready for a final topcoat using, for example, a high-bake synthetic enamel bake to complete the body-finishing operation. All of this operation following the electrocoating step is conventional.

Tank 7 is continuously or intermittently supplied with the makeup bath through line 15 from a premix or bath preparation tank 16, which can be provided with suitable agitation means, to compensate for depletion of bath solids. Tanks 17 and 18, respectively, contain high solids pigment dispersion and high solids vehicle dispersion which are maintained as "separate entities" until they are mixed together in the premix tank 16 with bath diluent. Tanks 17 and 18 can also be provided with suitable agitation means, the contents from these tanks being fed continuously or intermittently, and independently, via lines 19 and 21, respectively, to tank 16. The bath diluent, such as water, can be supplied via line 22 to line 16 and, similarly, amine (or other alkaline neutralizing agent) can be supplied via line 23. Bath 6 can also be provided with suitable agitation means and in the preferred embodiment the bath is continuously or intermittently withdrawn from tank 7 and recirculated through premix tank 16 by means of line 24. A plurality of stock pigment and vehicle dispersions can be made available with different compositions and properties and used in place of others as desired, for example, when different coatings are required or when different bath properties such as solids content, solvent content, etc., are required. The various bath component supply lines and bath supply and recirculating lines can be provided with flow regulating means such as flow control valves, as shown, to regulate and manipulate flow. Various other appurtenances such as bath agitation pumps, check valves, flow meters, heat exchange means, bath filters, thermometers, pH meters, etc., common in the art, can be used but are not shown in the interest of brevity. If desired, the entire process can be automated.

Although the drawing shows the preparation of the bath external to the actual electrocoating tank, it is within the scope of this invention to actually prepare the bath in tank 7 itself. That is, instead of using a bath premix tank, the pigment dispersion and vehicle dispersion entities, as well as the bath diluent and other bath components, can be supplied directly to tank 7. Alternatively, the vehicle dispersion can be diluted with some or all of the bath diluent to a low solids level and the pigment dispersion then added to the diluted vehicle, or the pigment dispersion can be diluted with some or all of the bath diluent to a low solids level and the vehicle dispersion then added to the diluted pigment dispersion. Other methods for preparing the bath can be used, but it should be remembered that according to this invention the pigment dispersion and vehicle dispersion are not mixed together in the absence of sufficient bath diluent to limit the total non-volatile solids to about 5 to 35 weight percent.

Generally speaking, the vehicle (or pigment binder) dispersion used in this invention comprises a dispersion, solution, suspension, or emulsion of a polycarboxylic acid resin in a liquid diluent. (The term "dispersion" is used in this specification and in the appended claims to cover these various systems.) For use in aqueous systems, the resin is at least partially neutralized, for example, with a water-soluble neutralizing agent, preferably a water-soluble amino compound or ammonia, though alkali metal hydroxides, such as sodium hydroxides, can be used. The amount of neutralizing agent used generally will be that sufficient to neutralize 20 to 80 percent, preferably 30 to 60 percent, of the theoretical acid groups (i.e., carboxyl,anhydride or ester groups) in the resin. The polycarboxylic acid resins will generally have an average molecular weight between 500 and 5000, and acid numbers between 30 and 300, preferably between 50 and 175. Such neutralized resins will, when dispersed in the bath, exhibit polyelectrolyte behavior. Those neutralized resins which exhibit anionic polyelectrolyte behavior are preferred, though those which exhibit cationic polyelectrolyte behavior can also be used. The vehicle dispersion will generally have a non-volatile resin solids content of about 25 to 95% by weight, preferably 50 to 80% by weight, and about 1 to 10% by weight of water-soluble neutralizing agent, which, as stated before, is preferably a water-soluble amino compound, this latter percent being based on the weight of the resin; the balance of the vehicle dispersion will be liquid diluent, which can be water or organic solvent, or both. In another aspect of this invention, some or all of the amine used to partially neutralize the polycarboxylic acid resin can be withheld from the vehicle dispersion and added instead to the bath during dilution or after dilution of the vehicle dispersion with the bath diluent. In still another aspect, some or all of the amine requirement can be present in the pigment dispersion and affect the neutralization of the resin when admixed with the resin in the bath preparation step.

A preferred class of resins which can be used in preparing the vehicle dispersions of this invention is that prepared according to U.S. Patent No. 3,098,834, issued July 23, 1963, to Robert D. Jerabek. The resins disclosed in this patent cover commercial compositions such as Arolon 324 and comprise cyclopentadiene modified-drying oil resin compositions which are dilutable or thinned with water to form substantially clear solutions and will dry and harden to form water-insoluble films. These resins are generally prepared by reacting a cyclopentadiene modified-drying oil resin having an acid number of less than 3 (and containing in the resin molecule residual unsaturated groups derived from the drying oil) with an $\alpha,\beta$-unsaturated ethylenic carboxylic in an amount sufficient to increase the acid number of the resin to within the range of 30 to 175.

Another preferred class of resins which can be used in the preparation of the vehicle dispersions of this invention is that disclosed and claimed in co-filed, co-pending application Ser. No. 424,825. The resins of this co-pending application are prepared, for example, by maleinizing a modified drying oil such as copolymer of cyclopentadiene and linseed oil blended with dehydrated castor oil and then heating the reaction product with a low molecular weight liquid (preferably hydroxy-containing) such as ethylene glycol and Cellosolve (the monoether of ethylene glycol), and blending the resulting product to a viscosity of 100 to 150 stokes at 80 weight percent solids.

Other examples of polycarboxylic acid resins which can be used representatively include: drying oils (including semi-drying oils and free unsaturated fatty acids and esters thereof, particularly the natural glycerides) coupled or reacted with an alpha,beta-ethylenically unsaturated dicarboxylic acid or anhydride; coupled glyceride drying oils polymerized with a vinyl-substituted monomer such as styrene, vinyl toluene, butadiene, acrylic acid, acrylonitrile or other unsaturated polymerizable monomer such as cyclopentadiene. Patents which disclose polycarboxylic acid resins which can be used in this invention to prepare vehicle dispersions include: U.S. Patents Nos. 2,188,883; 2,188,885; 2,188,888; 2,262,923; 2,678,934; 2,285,646; 2,820,711; 2,286,466; 2,188,890; 2,298,914; 2,502,606; 2,634,256; 2,369,683; 2,384,846 and 2,731,481; South African Patents Nos. 62/3,314 and 63/525; and Great Britain Patents Nos. 933,175 and 407,957.

Said resins can be prepared in the presence of solvents, including various aliphatic, cycloaliphatic, and aromatic hydrocarbons, or after they are prepared they can be dispersed in such solvents. Representative solvents which can be used include mineral spirits, xylene, benzene, toluene, petroleum naptha, gelohexane, etc. The amount of solvent used can vary and will be dependent on such factors as the viscosity and solids levels desired, and generally will amount to 5 to 200 weight percent of the resin solids.

The polycarboxylic acid resins can be partially neutralized with ammonia- mono- or poly-amines, hydroxyl amines or other inorganic or organic neutralizing agents (preferably water-soluble) in an amount sufficient to neutralize from 20–150 percent of the theoretical acid groups in the resin, the solution of dispersed resin having, for example, pH's of 7.0 to 9.5. We prefer to use amines (primary, secondary or tertiary) which are volatile at temperatures below 375° F.

Representative neutralizing agents which can be used include ammonia, ammonium hydroxide, di- and trimethyl amine, mono-, di-, and tri-ethylamine, morpholine, mono-, di-, and tri-ethanolamine, mono-, di, and triisopropanolamine, hydroxylamine, butanolamine, octanolamine, ethylene diamine, diethylene triamine, triethylene tetramine, propylene diamine, 1,3-diaminopropane, the reaction product of ethylene diamine with ethylene oxide, polyglycol amines, N-methyl ethanolamine, N-ammoethyl ethanolamine, and the like, including mixtures thereof. The neutralizing agent is preferably added as an aqueous solution to the resin. The preferred amine to be used is diethylamine for efficiency and economy.

Generally, the amount of neutralizing agent present in the bath will be an amount sufficient to maintain the vehicle or resin solids dispersed in the bath and deposited on the surface to be coated at the desired levels or pigment/resin weight ratios (e.g., 1/4 to 1/1). To assist the neutralizing agent in solubilizing or dispersing the polycarboxylic acid resin and to adjust the viscosity of the bath, non-ionic organic solvents compatible with the resin can be used, for example, in the amount between 0.1 and 30 weight percent resin in the bath. Representative organic solvents of this type include aliphatic, cycloalipatic, and aromatic hydrocarbons or mixtures, such as those described above in the preparation of the resin. These organic solvents can also be used to lower the solids content and viscosity of the resins so as to make it easier to handle these resins. In order to stabilize the viscosity of the resin dispersed in such solvents, low molecular weight liquid, hydroxy-containing co-solvents can also be used, as alkyl, cycloalkyl and aromatic mono- or polyhydric alcohols, which can be substituted with either substituents and/or carboxyl substituents. Representative hydroxyl-containing compounds which can be used for this purpose include aliphatic alcohols such as methanol, ethanol, butanol, isobutanol, amyl alcohol, and octyl alcohol, cycloaliphatic alcohols such as cyclohexanol, aromatic alcohols such as benzyl alcohol, products such as Cyclol (adduct of allyl alcohol and cyclopentadiene), polyhydric alcohols such as ethylene glycol, propylene glycol, glycerol, polyethylene glycol, polypropylene glycol, the methyl, ethyl, propyl and butyl ethers of mono- or diethylene and proplyene glycol, trimethylolethane, trimethylolpropane, dimethylpropanoic acid, water, and the like, including mixtures.

The pigments which can be used in this invention to prepare the separate pigment dispersion include a host of well-known inorganic and organic pigments which will be insoluble and electrolytic in the bath. These pigments can be of natural or synthetic origin and include various metal oxides and metal compounds, such as yellow iron oxide, red iron oxide, white lead, zinc oxide, rutile titanium dioxide, magnesium oxide, chromium oxide, antimony oxide, lead chromate, zinc chromate, lead silico chromate, strontium chromate, lithopone, etc. Inert or filler materials which can also be used include barium sulfate, calcium carbonate, magnesium silicate, aluminum silicate, magnesium carbonate, silica, mica, pumice, bentonite, china clay, diatomite, talc, blanc fixe, etc. Another useful pigment is carbon black. Toluidine and phthalocyanine blue are examples of typical organic pigments. Combinations of various pigments can also be used. In preparing the pigment dispersion, the pigment can be ground in the presence of suitable grinding aids, dispersants, wetting agents, etc., the particle size of the ground pigment product varying generally in the colloidal or semi-colloidal range, e.g., 1 to 50 microns, preferably 10 to 20 microns, in diameter. Water will be the most common dispersing medium for the ground pigment, and the total non-volatile solids in the pigment dispersion will generally vary in the range of 25 to 75 weight percent, preferably 30 to 55 weight percent, based on the weight of the dispersion. The pigment can also be ground in the presence of some of the resin, and where this is done the amount of resin so-used will be a minor amount (i.e., less than 50 percent and preferably less than 25 percent) of the total resin to be dispersed in the bath.

Apart from the manner in which the electrocoating bath is prepared, and its composition and properties controlled, the coating or deposition operation is carried out much in the same manner as that of the prior art, although the subject invention results in greater latitude and reliability over control of the variables associated with the operation. The relationships between such process variables as solids concentration, pH, voltage, current, time, and temperature are now generally known. Generally, the DC current used will have an amperage of 0.1 to 10 amperes per square foot of electrode surface immersed, the voltage will be in the range of 50 to 1000 volts, and the conductivity of the bath will be in the range of 100 to 3000 $ohm^{-1}/cm$.

Generally, the total non-volatile bath solids will be in the range of 5 to 35 weight percent, preferably 8 to 20 weight percent, and the bath temperatures will generally be in the range of 60 to 120° F., preferably 70 to 90° F. The pH will generally vary between 5 to 10, preferably 7.5 to 9.0. The thickness of the coating will vary and be dependent on such factors as the voltage applied, the time of application, and the particular bath and metal used. Generally, between 50 and 500 coulombs of electricity per square foot will be necessary to deposit a coating having a thickness between 0.5 to 3 mils and pigment/resin solids weight ratios between 0.02/1 and 2/1. The voltage can be increased as the deposition progresses (constant current technique) or the voltage can be fixed as deposition progresses (constant voltage technique).

The substrates or articles which can be electrocoated according to this invention include any of those which are sufficiently electrically conductive, and representatively include mild steel, stainless steel, phosphated steel, aluminum alloys, tin plate, brass, copper, zinc, etc. The various metals will usually require different voltages and immersion time, and optimum electrocoating conditions can be determined by simple, routine tests.

The following examples further illustrate the objects and advantages of this invention, but it should be understood that the various materials used in these examples, as well as the modes of operation and process conditions recited in these examples, should not be construed so as to unduly limit this invention.

EXAMPLE I

Vehicle and pigment dispersions were separately prepared and added concurrently and slowly with agitation to water containing a small amount of diethylamine. The resin used in preparing the vehicle dispersion was one prepared in accordance with that disclosed and claimed in said co-pending application, Ser. No. 424,825. More specifically, this resin was prepared as follows: a copolymer of 18 wt. percent cyclopentadiene and 82 wt. percent linseed oil was blended with an equal weight of dehydrated castor oil; 100 parts of the blend was reacted at a temperature in the range of 300 to 500° F. with 11 parts of maleic anhydride; the reaction product was reacted with 1.8 parts of ethylene glycol and 5.3 parts of ethyl Cellosolve; the resulting reaction product was then blended with a mixture of 70 wt. percent mineral spirits and 30 wt. percent n-butyl alcohol to get a resin solution with a viscosity of 117 stokes and an acid number of 59. This resin solution was then emulsified and neutralized to get an oil-in-water emulsion with 50 wt. percent non-volatile solids by mixing 224 parts of the resin solution with 134 parts of water and about 6 parts of diethylamine.

The pigment dispersion was prepared by mixing 500 parts of water, 310 parts of the neutralized resin solution described in the preceding paragraph (and used here as a pigment grinding aid), and about 30 parts of diethylamine; then 800 parts of ferric oxide, 78 parts of diatomaceous earth (Cabosil), about 10 parts of a 25% solution of a silicone wetting agent (Silicone DL 5310) and 100 parts of deionized water were mixed and ground in a pebble mill to provide a pigment dispersion having 9.4 wt. percent non-volatile resin solids and 36.2 wt. percent non-volatile pigment solids.

The vehicle emulsion, amounting to 323.6 parts, and the pigment dispersion, amounting to 150.5 parts, were concurrently and slowly added with agitation to a mixture of 2591 parts of water and about 1.5 parts of diethylamine. The so-prepared electrocoating bath had a pH of 8.15, a pigment volume concentration (PVC) of 5.65%, and contained 7.5 wt. percent non-volatile solids.

A plurality of Bonderite 37 test panels (4" x 12" of 20 gauge steel precoated with zinc phosphate) were electrocoated in turn in said bath at preset E.M.F.'s of 500, 600, and 700 volts of DC current. The electrocoated panels were then withdrawn from the bath, rinsed with tap water, and baked at 340° F. for 20 min. In all cases, the coatings obtained were uniform in thickness, had a desirable semi-gloss and excellent surface integrity, and were strongly adherent (they could not be rubbed off with the finger even before curing).

The apparatus used in carrying out the above electrocoating operation comprised a 1-gal., tin-plated steel can into which each test panel was lowered automatically at a rate of 1 ft. per min., using a motor-driven, geared arm to which the panel was affixed. The can was grounded and served as a cathode while the hanger from which the panel depended was connected to the positive pole of a power source so that the panel served as the anode of an electrical circuit. The bath (about 3000 g.) was prepared in the can and the panel lowered uniformly until about ⅞ of the panel was immersed in the bath; after one minute, the panel was uniformly withdrawn from the bath at the rate of 1 ft. per min.

EXAMPLE II

In this example, an electrocating bath was prepared in the same manner as that described in Example I, using the same vehicle dispersion and general bath preparation procedure. However, the pigment dispersion in this case did not contain any Cabosil, and the bath contained 10.58 wt. percent non-volatile resin solids and 37.5 wt. percent non-volatile pigment solids. Four hundred sixty parts of the vehicle emulsion and 147 parts of the pigment dispersion were concurrently and slowly added with agitation to 2393 parts of water containing about 1.5 parts diethylamine. The so-prepared electrocoating bath had a pH of 7.5, a PVC of 4.8% and contained 10 wt. percent non-volatile solids. Using the apparatus described in Example I, a plurality of Bonderite 37 panels were electrically coated, using voltages in the range of 100 to 700 volts. The coatings obtained varied from 0.35 to 1.95 mils in thickness and were of excellent character, as evidenced by their surface integrity and semi-gloss.

EXAMPLE III

In this example, an electrocating bath was prepared in the same manner as that described in Example I, using the same vehicle dispersion and general bath preparation procedure. However, the pigment dispersion in this case did not contain any vehicle, and it contained 39.3 wt. percent non-volatile pigment solids. The emulsion vehicle in the amount of 361.6 parts and 122.5 parts of the pigment dispersion were concurrently and slowly added with agitation of 2515.9 parts of water containing about 1.5 parts diethylamine. The so-prepared electrocoating bath had a pH of 8.3, a PVC of 5.7% and contained 7.5 wt. percent non-volatile solids. A plurality of Bonderite 37 panels were coated with this bath, using the apparatus of Example I and pre-set voltages of 200 to 400 volts to once again obtain excellent depositions on the panels.

EXAMPLE IV

In this example, the vehicle used comprised 534 parts of a commercial water-dispersible resin, Arolon 324, which was 80% theoretically neutralized with diethylamine. This resin had a viscosity in the range of 6 to 9 stokes, non-volatile solids content of 43 wt. percent, an acid number in the range of 100 to 120, and a pH of 8 to 9. The vehicle and 147 parts of the same pigment dispersion described in Example II were concurrently added and slowly mixed with agitation with 2319 parts of water. The so-prepared bath had a pH of 8.5, a PVC of 4.8% and contained 10 wt. percent non-volatile solids. A plurality of Bonderite 37 panels were electrocoated with this bath using pre-set voltages in the range of 30 to 75 volts to obtain excellent depositions having thicknesses of 0.2 to 0.6 mil.

EXAMPLE V

The vehicle dispersion used in this example was a watei solution of a commercial resin (Eopk W. 1762, a water-soluble, maleinized drying oil). Four hundred eight parts of this vehicle and 147 parts of the pigment dispersion described in Example II were concurrently added and slowly admixed with 2448 parts of water containing about .8 part of diethylamine. The so-prepared bath had a pH of 7.5, a PVC of 4.8% and contained 10 wt. percent of non-volatile solids. A plurality of Bonderite 37 panels were electrically coated with this bath using the apparatus of Example I over a pre-set voltage range of 50 to 200 volts. Excellent depositions were obtained with thicknesses ranging from 0.3 mil to 1.3 mils.

EXAMPLE VI

In this example, the "separate entity" concept of this invention is illustrated as applied in a system where electrocoating is carried out on a continuous basis with manipulation of bath variables during the operation. The apparatus used comprised a 5-gal. electrocoating metal tank provided with roller adapted to permit the travel therethrough of a 12-in. wide, 5-mil. thick strip of shim stock metal (Bonderite 37) and maintain at all times the immersion of a foot-long portion of this metal in the bath. The apparatus further comprised a stand surmounted by a spool or coil or said metal upstream of the tank. Heat exchange means were disposed beneath the tank and means provided to allow for the continuous withdrawal of bath liquid from the tank and circulation through the heat exchanger to permit the continuous control of the bath temperature and continuous agitation of the bath. Another circulatory system was provided whereby a portion of the bath could be continuously or intermittently circulated through a filter to remove large solids from the bath. At an elevation above the tank, a makeup or reload tank was provided to permit flow of formulated or premixed bath to the electrocoating tank by means of gravity flow, and means to continuously withdraw a portion of the bath and return it to the makeup tank. In addition, another tank was provided to hold the pigment dispersion and still another tank to hold the vehicle dispersion, with supply lines from these tanks to the makeup tank to permit continuous pumping of the contents thereof into the makeup tank at controlled rates. The makeup tank was also provided with a water supply line. The power source for the electrocoating operation comprised a DC rectifier, with the positive lead from this rectifier being connected to the stand, giving the whole assembly, including the coil of shim stock, a positive charge, and another lead from the rectifier was connected to the bath tank itself, making it a negative electrode or cathode. Means were also provided to continuously measure and indicate the bath temperature and means to measure and control the voltage and amperage.

In carrying out the continuous coating of the shim stock by means of this invention with such apparatus, a plurality of vehicle and pigment dispersions (red iron oxide) were prepared and maintained as separate entities. The various polycarboxylic acid resin solutions used in this continuous run are summarized in Table I, and the compositions of the vehicle dispersions and pigment dispersions (or mill bases) are summarized in Tables II and III respectively.

TABLE I

| Resin solution | Non-volatile solids, wt. percent | Viscosity, stokes | Acid number |
|---|---|---|---|
| A [1] | 79.5 | 132 | 56.9 |
| B [2] | 80.4 | 152 | 55.8 |
| C [3] | 80.1 | 131.8 | 62.4 |

[1] This resin solution is the same as that described in Example I.
[2] This resin solution was prepared like resin solution A, except that the indicated acid number and viscosity were obtained by blending the resin product instead with a mixture of 30 wt. percent mineral spirits, 20 wt. percent n-butyl alcohol, and 50 wt. peicent diethylcarbitol.
[3] This resin solution was prepared like resin solution A, except that the indicated acid number and viscosity were obtained by blending the resin product instead with a mixture of 30 wt. percent mineral spirits, 15 wt. percent n-butyl alcohol, and 55 wt. percent diethylcarbitol.

TABLE II

| Vehicle dispersion | Resin solution used | Non-volatile solids, wt. percent | Diethylamine, percent of theoretical |
|---|---|---|---|
| A | A | 57.8 | 25 |
| B | A | 52.5 | 23 |
| C | A | 52.5 | 26 |
| D | A | 57.8 | 26 |
| E | B | 52.5 | 26.2 |
| F | B | 57.8 | 25 |
| G | B | 58.3 | 24.1 |
| H | C | 45 | 30 |

TABLE III

| Pigment dispersion | Resin solution used | Non-volatile solids, wt. % | | Diethylamine, percent of theoretical |
|---|---|---|---|---|
| | | Pigment solids | Vehicle solids | |
| A [1] | B | 37.5 | 10.5 | 109 |
| B [2] | B | 37.5 | 10.5 | 109 |

[1] Contained silicone wetting agent (Silicone DL 5310).
[2] Like pigment dispersion A, but mineral spirits was substituted for wetting agent.

During the continuous run, bath variables and electrical conditions were monitored and manipulated to compensate for disturbances or imbalance. Table IV summarizes the operation together with the particular vehicle and pigment dispersions used at the various times during the run as well as coated shim stock footage at the time the reportεd variables and conditions were measured or extant. This run shows particularly control over bath solids level, pH, amine level, conductivity, bath volume, and voltage while electrocoating progressed.

TABLE IV

| Coated shim stock footage, cum. ft. | Bath properties: Non-vola. solids wt. percent | Bath properties: Conductivity, 1/ohms | Bath properties: DEA [1] conc., milli-equiv. | Bath properties: pH | Bath properties: Temp., ° F. | Current: Amps | Current: Pre-set EMF, volts |
|---|---|---|---|---|---|---|---|
| | Stage I, using vehicle dispersion A and pigment dispersion A | | | | | | |
| 0 | 9.4 | 429 | 31.2 | 8.25 | 74 | 1.9 | 450 |
| | Stage II, using vehicle dispersion H and pigment dispersion A | | | | | | |
| 20 | 8.26 | | | 8.15 | 72 | 1.8 | 450 |
| 21 | | 504 | | 8.25 | 75 | 2.4 | 450 |
| 54 | | | | | | 2.4 | 450 |
| 80 | 7.2 | 584 | 39 | 8.30 | | 2.7 | 450 |
| 81 | | | | 8.20 | 74 | 2.5 | 450 |
| 100 | | | | | | 2.9 | 450 |
| | Stage III, using vehicle dispersion E and pigment dispersion A | | | | | | |
| 120 | | | | | | 2.9 | 450 |
| 150 | 10.6 | | 39 | | 75 | 2.7 | 450 |
| 188 | | | | | 76 | 2.9 | 450 |
| 205 | | | | | 76 | 3.2 | 450 |
| 208 | | 777 | | 8.25 | 76 | 3.2 | 450 |
| 208 [2] | 10.4 | 830 | 42.4 | | | | |
| | Stage IV, using vehicle dispersion C and pigment dispersion A | | | | | | |
| 208 [3] | 10.4 | 830 | | 8.35 | 75 | 3.4 | 450 |
| 218 | | | | | 76 | 3.1 | 400 |
| 250 | | | | 8.35 | 76 | 3.5 | 400 |
| 275 | | 850 | | 8.40 | 75 | 3.5 | 400 |
| 280 | 10.9 | | | | 75 | 3.3 | 400 |
| 340 | 12.6 | 834 | 44.8 | | 77 | 3.3 | 400 |
| 387 | | | | | | 3.6 | 400 |
| 395 | | | | | 78 | 3.6 | 400 |
| 405 | 12.0 | | | 8.25 | 78 | 3.6 | 400 |
| 475 | 12.0 | 860 | | 8.65 | 75 | 3.6 | 400 |
| 530 | | | | | 75 | 3.4 | 350 |
| 540 | | | | | 75 | 3.9 | 350 |
| 545 | | 868 | | | 75 | 3.8 | 350 |
| 555 | | | | | 75 | 4.0 | 350 |
| 570 [2] | | | | 8.55 | 75 | 4.4 | 350 |
| 570 [3] | 10.1 | 834 | 55.6 | 8.55 | 75 | 3.7 | 300 |
| 267 | 9.7 | 847 | | 8.55 | 75 | 4.0 | 300 |
| 650 | | | | | 75 | 4.4 | 300 |
| | Stage V, using vehicle dispersion B and pigment dispersion A | | | | | | |
| 665 | | | | | 75 | 3.9 | 250 |
| 711 | | | | 8.80 | 72 | 4.4 | 250 |
| 725 [2] | 8.7 | 879 | | | 72 | 4.4 | 250 |
| 725 [3] | 8.9 | 920 | 58.4 | 8.50 | 75 | 3.1 | 250 |
| 775 | 9.9 | | | 8.50 | 72 | 2.9 | 250 |
| 811 | | 955 | | | 72 | 2.6 | 250 |
| 853 | 12.6 | | | | 75 | 3.1 | 300 |
| 876 | | | | | 75 | 2.8 | 300 |
| | Stage VI, using vehicle dispersion D and pigment dispersion A | | | | | | |
| 890 | | | | | | | |
| 916 | | | | | 77 | 2.6 | 300 |
| 920 | | 1,013 | | | 77 | 2.7 | 300 |
| 950 | | | | | 77 | 2.8 | 300 |
| 1,040 | | | | 8.40 | 72 | 3.4 | 300 |
| 1,130 [2] | | | | | 72 | 3.9 | 300 |
| 1,130 [3] | 12.3 | 1,062 | 53.2 | | | | |
| 1,192 | 10.2 | | | | 82 | 5.1 | 250 |
| | Stage VII, using vehicle dispersion F and pigment dispersion A | | | | | | |
| 1,192 | | | | | | | |
| 1,246 | 10.5 | 996 | | 8.75 | 70 | 3.7 | 200 |
| | Stage VIII, using vehicle dispersion G and pigment dispersion B | | | | | | |
| 1,265 | 9.9 | | | 8.50 | 69 | 4.4 | 250 |
| 1,320 | 10.0 | | | 8.50 | 72 | 4.2 | 250 |
| 1,350 | | | | | 75 | 4.2 | 250 |
| 1,380 | | 935 | | | 77 | 3.7 | 250 |
| 1,385 | | | | | 76 | 4.3 | 275 |
| | Stage IX, using vehicle dispersion G and pigment dispersion A | | | | | | |
| 1,417 | 9.7 | 955 | 59.8 | | 68 | 4.4 | 275 |
| 1,476 | 10.6 | | | | 72 | 3.5 | 275 |
| | Stage X, using vehicle dispersion J and pigment dispersion B | | | | | | |
| 1,476 | | | | | | | |
| 1,500 | | | | 8.70 | 74 | 3.4 | 275 |
| 1,515 | | | | | 74 | 3.7 | 275 |
| 1,520 | | | | | 74 | 3.8 | 275 |
| 1,540 | 10.8 | | | | 75 | 4.0 | 275 |
| 1,560 | | | | | 75 | 4.3 | 275 |
| 1,600 | | | | | 76 | 4.0 | 275 |
| 1,610 | | | | | 76 | 4.4 | 350 |
| 1,615 | 9.4 | 834 | | 8.80 | 76 | 4.4 | 350 |

[1] DEA=diethylamine.
[2] Data given for conditions at shutdown.
[3] Data given for conditions after starting up again.

What follows now is a chronological description of the continuous run, reference being made to said Tables I–IV.

The initial electrocoating bath used was prepared in accordance with the separate entity concept of this invention and amounted to 20,585 g. of a diluted mixture of vehicle dispersion A and pigment dispersion A, this bath having 9.4 wt. percent nonvolatile solids (or 1935 g. of solids) with a pH of 9.25. This bath was placed in the electrocoating tank and the first 20 ft. of shim stock was passed through this bath and electrocoated at 450 volts without replacement of or addition to the tank from the makeup bath. After this initial 20 ft. of shim stock was coated, the solids content of the bath, its conductivity and its concentration of diethylamine was determined. In making this determination, a sample of the bath was withdrawn and weighed, heated to 300° F. for ½ hr., and weighed again. The non-volatile solids content of the bath was then determined by dividing the weight of solids after said heating by the weight of the bath sample, and multiplying the quotient by 100. (The solids concentration of the bath was determined repeatedly during the continuous run by the same method.) At this point of operation, the bath makeup tank was supplied with separate streams of vehicle emulsion H and pigment dispersion A. From the said determination of both solids, the flow rate of the separate vehicle dispersion and pigment dispersion components to the makeup tank were adjusted so as to maintain the supply of total solids from the makeup tank to the electrocoating tank at 11.75 g. of solids per minute, 75.5% of this total being solids derived from the vehicle dispersion and 23.5% of this total being solids derived from the pigment dispersion. After having made this adjustment in the flow rates of the separate entities, the apparatus was shut down overnight. Before starting up the next morning, the flow rate of said separate entities were adjusted to said predetermined rates and 400 g. of deionized water where then added to compensate for "drag out" losses. Electrocoating was then continued until 80 cumulative ft. had been passed through the bath, after which the separate entity vehicle and pigment dispersions were adjusted to maintain the said 75.5%/23.5% ratio (which was equal to 15.37 g. of total solids being added to the electrocoating bath per minute). The apparatus was then shut down and 283 g. of additional pigment dispersion and 1040 g. of additional vehicle dispersion were added to the bath to readjust the solids content thereof to the original value (9.4 wt. percent). The flow rate of the pigment and vehicle dispersions to the makeup tank were then adjusted to 3.6 g. of solids/min. and 11.4 g. of solids/min., respectively, and the operation continued until 100 cumulative ft. of shim stock was coated. At this time, 500 g. of bath was removed to prevent its overflow, and coating continued until 120 cumulative ft. had been coated. At this time, vehicle dispersion E was substituted for vehicle dispersion H, and the flow rate of the separate entities to the makeup tank adjusted to maintain said 75.5%/23.5% ratio. Electrocoating was continued until 188 cumulative ft. had been coated; 500 g. of bath was then withdrawn to compensate for overflow, and the operation continued until 205 cumulative ft. had been coated, after which another 500 g. of overflow was withdrawn, and the apparatus shut down. Before starting up the next day, vehicle dispersion C was substituted and the flow rates of the separate entities adjusted to 3.6 g. of pigment dispersion solids and 11.4 g. of vehicle dispersion solids per minute. Coating was continued until 218 cumulative ft. had been passed through the tank, after which the voltage was dropped from 450 to 400 volts to compensate or prevent gassing on the deposited coating. After 250 cumulative ft. had been coated, 400 g. of bath was removed, and coating continued until 275 cumulative ft. had been coated, after which another 400 g. of bath was removed. Coating was then continued until 280 cumulative ft. had been coated, after which the pigment dispersion solids rate was again adjusted to 3.4 g./min. After 340 cumulative ft. had been coated, another 400 g. of bath were removed, and during the coating of the shim stock between 364 and 385 cumulative ft., the operation was continued without reloading the electrocoating tank with makeup bath. Coating was then continued until 395 cumulative ft., after which 500 g. of water were added to compensate for drag out. After 540 cumulative ft., another 600 g. of water was added, and after 555 cumulative ft. had been coated, the makeup supply was discontinued because of the high solids content of the bath in the tank. After shutdown overnight, 1000 g. of water was added, and the operation started up again at 300 volts, with an adjusted makeup rate to maintain 7.05 g. of solids/min. bath replenishment (i.e., 5.25 g. of vehicle dispersion solids/min. and 1.8 g. of pigment dispersion solids/min.). After running to 650 cumulative ft., vehicle dispersion B was substituted and the voltage reduced to 250 volts, coating was continued until 711 cumulative ft., after which 600 g. of water were added, and coating continued to 725 cumulative ft., after which the operation was shut down. At this time, 1500 g. of water, 63.2 g. of pigment dispersion, and 206 g. of vehicle dispersion were added to the tank. During shutdown overnight, the bath was continuously passed through a 25 micron filter. Startup the next day was continued with reload rates of 2.27 g. of pigment dispersion solids/min. and 7.38 g. of vehicle dispersion solids/min. Electrocoating was then continued to 850 cumulative ft., at which time the voltage was increased to 300 volts. At 876 cumulative ft., 500 cc. of bath were removed to prevent overflow and at 890 cumulative ft., vehicle dispersion D was substituted and the reload rates were adjusted to 5.2 g. of vehicle dispersion solids/min. and 1.44 g. of pigment dispersion solids/min. to reduce the PVC of the bath. The run was continued, with an addition of 600 g. of water at 920 cumulative ft., another 600 g. of water at 940 cumulative ft., and another 500 g. of water at 950 cumulative ft. After shutdown overnight and startup the next day, another 500 g. of water at 1020 cumulative ft. were added. After 1040 cumulative feet had been coated, operation was shut down over the weekend. Operation was then continued and 250 portions of water were added at 1092, 1115, and 1126 cumulative ft. Operation was discontinued at 1130 cumulative ft. and continued thereafter at 250 volts after 1000 g. of water had been added with replenishment of only pigment dispersion solids at 3.4 g./min. because of excessive gassing. The run was continued to 1192 cumulative ft. with just replenishment of the mill base. At 1192 cumulative ft., vehicle dispersion F was substituted, and the reload rates of the separate entities were adjusted to 7.4 g. of vehicle solids/min. and 2.3 g. of pigment dispersion solids/min. The run was continued to 1254 cumulative ft. with continuous replenishment of both entities. At this point, the bath was withdrawn from the tank and the tank cleaned. The withdrawn bath was filtered, and the filtered bath returned to the cleaned tank. At this point, before starting up, vehicle dispersion G and pigment dispersion B were substituted and the operation continued with replenishment of vehicle dispersion solids at the rate of 7.4 g./min. and replenishment of the pigment dispersion solids at 2.4 g./min. After running to 1320 cumulative ft., 600 g. of water were added to the bath; after 1350 cumulative ft., 500 g. of water were added; and after 1380 cumulative ft., additional 500 g. of water were added. After 1380 cumulative ft., the voltage was increased to 275 volts in view of the drop in amperage and the run continued to 1417 cumulalative ft. and shut down. Before starting up again, 600 g. of water were added to the bath, and the replenishment rate of vehicle dispersion solids was adjusted to 7.4 g./min., and the replenishment rate of pigment dispersion solids was adjusted to 3.8 g./min. At 1476 cumulative ft., vehicle dispersion J and pigment dispersion B were substituted, and the reload rates were adjusted to replenish the vehicle dispersion solids at the rate of 7.4 g./min., and the pigment dispersion solids at 2.3 g./min. At 1515 cumulative ft., replenishment of the bath with vehicle and pigment dispersions was discontinued, and 300 g. of water were added to the bath. At 1520 cumulative ft., replenishment of the bath was continued at the rate of 4.6 g. of vehicle dispersion solids/min. and 1.4 g. of pigment dispersion solids/min. From 1540 to 1600 cumulative ft., the voltage was increased to 350 volts and the operation continued until 1615 cumulative ft. had been coated, at which point the operation was terminated, since the purpose of the run, to observe and control variables, was accomplished.

EXAMPLE VII

In this example, four different electrocoating baths were prepared and evaluated. One of these baths was prepared by the separate entity concept of this invention, and the other baths were prepared by other procedures for purposes of comparison to demonstrate the objects and advantages of this invention. In all cases, the same vehicle and pigment dispersions were initially prepared as separate stock components. The resin solution employed in making the stock vehicel dispersion was of the same type described in Example I; however, it had 80.9 wt. percent non-volatile solids, an acid number of 53.8, and a viscosity of 123.5 stokes. Thirty two hundred g. of water containing 164 cc. of diethylamine were added to 8160 g. of the resin solution. The mixture was stirred, and 1440 g. of water and 32.8 cc. of diethylamine were added.

In preparing the stock pigment dispersion, the same type of resin was used as a grinding aid except that it had 80.2 wt. percent non-volatile solids, an acid value of 58.4, and a viscosity of 125 stokes. Six hundred twenty g. of this resin were added to 1000 g. of water, and 60 cc. of diethylamine were added with stirring to the diluted resin. To this mixture, 1756.8 g. of ferric oxide pigment were added, then 20 cc. of regular mineral spirits and then 1266 g. of water were added. This mixture was ground in a pebble mill. The final pigment dispersion had 48 wt. percent non-volatile solids (or 37.1 wt. percent pigment solids and 10.58 wt. percent resin solids). This dispersion contained 112 wt. percent of the diethylamine theoretically necessary to neutralize the acid groups in the resins.

In Run 1, 417 g. of the above-described vehicle dispersion were mixed with 186 g. of water, then 147 g. of the pigment dispersion was added. The mixture was stirred to provide a high solids paint formulation containing 40 wt. percent solids, and 35.2 wt. percent diethylamine (based on the amount of resins). In Run 2, 417 g. of said vehicle dispersion were mixed with a mixture of 186 g. of water and 4.8 cc. of diethylamine and then the resulting mixture was mixed with 147 g. of the above-described pigment dispersion. The resulting high solids paint formulation had 50 wt. percent solids and contained 55.2 wt. percent diethylamine (based on the amount of resins). In Run 3, 417 g. of said vehicle dispersion were mixed with 147 g. of said pigment dispersion to prepare a high solids paint formulation. These three paint formulations were allowed to stand in covered 1-quart jars at room temperature for about 72 hrs. After standing, the appearances of these formulations were observed: the formulations in all three cases exhibited stratification with the various layers of each formulation having different hues. In the case of Run 1, three phases appeared: a bottom layer, ¼ in. in height; a middle layer 1½ in. in height; and a top layer, 2⅝ in. in height. In Run 2, although the formulation had a high amine content in an attempt to stabilize it, two phases appeared: a bottom layer, ¼ in. in height; and a top layer, 4 in. in height. In Run 3, three phases appeared: a bottom layer, ⅝ in. in height; a middle layer, ½ in. in height; and a top layer, 2⅛ in. in height. Such stratification is graphic evidence of the instability and non-homogeneity of the formulations.

Electrocoating baths of about 3000 g. were prepared in steel 1-gal. cans with each of the three paint formulations at about 10 wt. percent total non-volatile solids. These baths were prepared by adding the paint formulations to water with stirring, and then adding 2 cc. of diethylamine (except in the case of Run 2); the amount of water used was that sufficient to make a 3000 g. bath. In making the bath of Run 4, the separate entity concept of this invention was used: 417 g. of vehicle emulsion and 147 g. of pigment dispersion were simultaneously poured into an agitating bath of water, after which 2 cc. of diethylamine were added; and resulting bath also contained about 10 wt. percent non-volatile total solids. The pH's of the four baths were determined: all had a pH of 8.3, except the bath of Run 2, which had a pH of 8.65. The so-mixed baths were stirred for about 10 min., and they were then used for electrocoating Bonderite 37 panels, using the apparatus described in Example I.

In all cases, the panels were electrocoated with pre-set E.M.F.'s of about 300 volts and at room temperature. Initial amperage readings were taken when the panels were completely immersed in the bath to the desired depth, and final amperage readings were taken upon the beginning of their withdrawal from the bath. In all cases (except Run 2), the initial amperage was 0.4 amp, which dropped to 0.05 amp upon withdrawal. In the case of Run 2, the initial amperage was 0.65 amp, and the final amperage upon withdrawal was 0.07 amp.

After the panels were electrocoated and baked at 340° F. for 20 min., they were examined. The electrocoated panel of Run 1 had a 0.90 mil coating, which was glossy and light-colored in appearance and had a plurality of surface irregularities ("pimples" or "specks"), probably aggregates of emulsion particles. The electorcoated panel of Run 2 had a 1.0 mil coating, which was glossy and had extensive surface irregularities ("hogbacking") due to the formation of gas bubbles. The electrocoated panel of Run 3 had a 1.1 mil coating and was also glossy and light in color and had a plurality of surface irregularities like that of Run 1. By way of contrast, the electrocoated panel of Run 4, prepared in accordance with the separate entity concept of this invention, had an 0.85 mil coating and the appearance of this coating was excellent in that it was significantly darker, semi-glossy, and the coating had only a few surface irregularities, as compared to the panels of the other runs.

Following the electrocoating operations, it was observed that the bath of Run 1 had a plurality of non-dispersed, irregularly shaped aggregates, about ½ in. in diameter, settled on the bottom of the bath container, and in the case of Run 3, a thick sludge had settled on the bottom of the bath container. The bath of Run 4, however, still retained its solids in dispersed form and appeared homogenous.

As used in this application, the term "acid value" or "acid number") means the analytical value indicative of the free acid (and/or) acid anhydride in a system as determined according to Gardner & Sward's Paint Testing Manual, 12th ed., 1962, p. 425, which procedure follows essentially that of ASTM D555; the term represents the number of milligrams of KOH required to neutralize the acidity of a 1-gram sample of non-volatile solids. Where the weight percent of non-volatile solids of a system is recited, this value is determined according to method B on p. 505 of said manual by placing 0.5 gram of sample in a 100 mm. diameter aluminum dish, diluting the sample with 1–2 ml. of a solvent such as benzene, heating the sample on a hot plate (150° C.) for 30 minutes, cooling, weighing the non-volatile residue, subtracting this weight from that of the sample, and multiplying the remainder by 100. The term "iodine value" (or "iodine number") means the analytical value indicative of the unsaturation of a system as determined according to p. 428–429 of said manual, and represents the percent of iodine which will react with an unsaturated material. Where the viscosity of a system is recited, in terms of stokes, the viscosity measurement is determined according to the Gardner-Holdt bubble viscosity procedure described on p. 171 of said manual. The term "hydroxyl value" (or "hydroxyl number") means the analytical value determined according to p. 433 of said manual, and represents the amount of hydroxyl groups in a system.

Various modifications and alterations of this invention will become apparent to those skilled in the art without departing from the scope and spirit of this invention, and it should be understood that this invention should not be limited unduly to that set forth herein for illustrative purposes.

I claim:

1. A process for preparing an electrocoating bath, comprising admixing, without first forming a paint, a polycarboxylic acid resin and pigment by bringing them together in the presence of sufficient liquid diluent to provide an electrocoating bath having a total non-volatile solids content suitable for electrocoating.

2. A process for preparing an electrocoating bath, comprising admixing, without first forming a paint, a dispersion of a polycarboxylic acid resin and a dispersion of pigment by bringing them together in the presence of sufficient water to provide an electrocoating bath comprising a dispersion of said resin and pigment having a total non-volatile solids content of 5 to 35 weight percent and sufficient neutralizing agent to render said resin water-dispersible.

3. A process for preparing an electrocoating bath, comprising separately and simultaneously adding to a body of water without first forming a paint, sufficient amounts of a dispersion of a water-dispersible, partially neutralized polycarboxylic acid resin and a dispersion of pigment to produce an electrocoating bath having a total non-volatile solids content of 5 to 35 weight percent.

4. The process of claim 3, wherein said resin comprises a maleinized cyclopentadiene-modified drying oil.

5. The process of claim 3, wherein said resin comprises a maleinized cyclopentadiene-modified linseed oil resin partially neutralized with diethylamine, and said pigment comprises red iron oxide.

6. In a process for electrocoating an electrically conductive substrate, the improvement comprising admixing, without first forming a paint, a polycarboxylic acid resin and pigment by bringing them together in the presence of sufficient liquid bath diluent to provide a bath used in said electrocoating having a total non-volatile solids content suitable for electrocoating.

7. In a process for electrocoating an electrically conductive substrate, the improvement comprising separately and simultaneously adding to a body of water without first forming a paint, sufficient amounts of a dispersion of a water-dispersible, partially neutralized polycarboxylic acid resin and a dispersion of pigment to provide an electrocoating bath having a total non-volatile solids content of 5 to 35 weight percent.

8. The process according to claim 7, wherein said substrate is a metallic article, said resin comprises a maleinzed cyclopentadiene-modified linseed oil resin partially neutralized with diethylamine, and said pigment comprises red iron oxide.

References Cited

UNITED STATES PATENTS

| | | | |
|---|---|---|---|
| 3,230,162 | 1/1966 | Gilchrist | 204—181 |
| 3,335,103 | 8/1967 | Huggard | 204—181 |
| 3,340,172 | 9/1967 | Huggard | 204—181 |

OTHER REFERENCES

Bondy: "Emulsions and Other Aqueous Media," in The Science of Surface Coatings, edited by Chatfield, 1962, p. 414.

HOWARD S. WILLIAMS, *Primary Examiner.*

E. ZAGARELLA, *Assistant Examiner.*